US011872712B2

(12) United States Patent
Lichtblau

(10) Patent No.: US 11,872,712 B2
(45) Date of Patent: Jan. 16, 2024

(54) PROPRIOCEPTIVE SHAVER

(71) Applicant: CLJI Worldwide LLC, North Palm Beach, FL (US)

(72) Inventor: Craig H. Lichtblau, North Palm Beach, FL (US)

(73) Assignee: CLJI Worldwide, LLC, North Palm Beach, FL (US)

( * ) Notice: Subject to any disclaimer, the term of this patent is extended or adjusted under 35 U.S.C. 154(b) by 52 days.

(21) Appl. No.: 17/144,953

(22) Filed: Jan. 8, 2021

(65) Prior Publication Data

US 2022/0219346 A1 Jul. 14, 2022

(51) Int. Cl.
*B26B 21/52* (2006.01)
*B26B 21/22* (2006.01)
*B26B 21/40* (2006.01)

(52) U.S. Cl.
CPC .......... *B26B 21/522* (2013.01); *B26B 21/225* (2013.01); *B26B 21/52* (2013.01); *B26B 21/521* (2013.01); *B26B 21/4012* (2013.01)

(58) Field of Classification Search
CPC ..... B26B 21/22; B26B 21/40; B26B 21/4012; B26B 21/52; B26B 21/521–523; B26B 21/527
USPC ......................... 30/47–51, 526–536; D28/48
See application file for complete search history.

(56) References Cited

U.S. PATENT DOCUMENTS 971,772 A * 10/1910 Millar .................. B26B 21/527 30/526
1,201,317 A * 10/1916 Lishawa .............. B26B 21/527 30/291
RE14,748 E * 11/1919 Goodwin ........................ 30/531
1,350,227 A * 8/1920 Jones ...................... B26B 19/16 30/41
1,354,658 A * 10/1920 Kane ....................... B26B 21/10 30/534
1,460,139 A * 6/1923 Parker ..................... B26B 21/16 30/526
1,785,917 A * 12/1930 Schuster ................ B26B 21/38 30/526

(Continued)

FOREIGN PATENT DOCUMENTS

DE 102018105820 1/2019
WO WO2012107713 8/2012
WO WO2019093931 5/2019

OTHER PUBLICATIONS

Mse, M., "Introducing EvoShave", Internet article, https://melaniesfabfinds.co.uk/chocolate/introducing-evoshave/, pp. 1-8, (Dec. 2016).

(Continued)

*Primary Examiner* — Jason Daniel Prone
(74) *Attorney, Agent, or Firm* — McHale & Slavin, P.A.

(57) ABSTRACT

A proprioceptive shaver for shaving/grooming intimate areas. The proprioceptive shaver for shaving one or more portions of a body includes a main body having a first end and a second opposing end, a user engagement member designed to provide multiple points of contact with a user's hand when in use, and a shaving assembly having a razor head having at least one or more cutting surfaces. The multiple points of contact may include areas at or near the metacarpophalangeal joint, proximal interphalangeal joint and distal inferior phalange of the user's hand.

20 Claims, 16 Drawing Sheets

(56) References Cited

U.S. PATENT DOCUMENTS

| | | | | | |
|---|---|---|---|---|---|
| 2,020,043 | A * | 11/1935 | Taylor | B26B 21/32 30/526 |
| 2,102,142 | A * | 12/1937 | Burnett | B26B 21/18 30/526 |
| 2,648,129 | A * | 8/1953 | Streeter | B26B 21/52 30/526 |
| 2,750,663 | A * | 6/1956 | Coles | B26B 21/08 30/31 |
| 2,848,806 | A * | 8/1958 | Shnitzler et al. | B26B 21/32 30/526 |
| 3,045,342 | A * | 7/1962 | Diehl | B26B 21/527 30/527 |
| 3,372,481 | A * | 3/1968 | Skinner | B26B 19/06 30/221 |
| 4,238,882 | A * | 12/1980 | Harrison, Sr. | B26B 21/44 30/41 |
| 4,542,585 | A * | 9/1985 | Ito | B26B 19/3853 30/298 |
| 4,768,528 | A * | 9/1988 | Steele, Jr. | A45D 24/36 D28/44.2 |
| D319,324 | S * | 8/1991 | Wahl | B26B 21/527 D28/53 |
| 6,029,356 | A * | 2/2000 | Sprinkle | B26B 21/527 30/526 |
| 6,079,758 | A * | 6/2000 | Romero | A45F 5/00 30/298 |
| 6,092,288 | A * | 7/2000 | Adachi | B26B 21/10 30/51 |
| D431,095 | S * | 9/2000 | Hyman | D28/48 |
| D484,769 | S * | 1/2004 | Cheung | B26B 21/527 D8/98 |
| 6,895,639 | B1 * | 5/2005 | Bayton | A45F 5/00 30/298 |
| D612,540 | S * | 3/2010 | Joslin | D28/48 |
| 7,805,845 | B2 * | 10/2010 | Kludjian | B26B 21/527 30/526 |
| 7,805,846 | B2 * | 10/2010 | Leventhal | B26B 21/40 30/526 |
| 8,141,258 | B1 * | 3/2012 | Frisch | B26B 21/527 30/526 |
| D679,447 | S * | 4/2013 | Colle | B26B 19/3853 D28/53 |
| 8,726,528 | B2 | 5/2014 | Lyles | |
| 8,732,966 | B2 * | 5/2014 | Snow | B26B 19/3853 30/537 |
| 8,782,911 | B1 * | 7/2014 | Greene | B26B 21/52 30/526 |
| 8,839,521 | B2 * | 9/2014 | Hazard | B26B 21/527 30/30 |
| D776,876 | S * | 1/2017 | Coviello | D28/48 |
| 9,713,879 | B2 | 7/2017 | Samuels et al. | |
| 9,849,599 | B2 * | 12/2017 | Gers-Barlag | B26B 21/52 |
| 10,011,029 | B2 * | 7/2018 | Bellisario | B26B 19/3813 |
| 10,052,774 | B2 * | 8/2018 | Giannelli | B26B 21/523 |
| 10,137,585 | B2 | 11/2018 | Gonterman | |
| 10,137,586 | B1 | 11/2018 | Strong | |
| 10,449,683 | B2 * | 10/2019 | Spencer | B26B 21/525 |
| 10,513,041 | B2 | 12/2019 | Green | |
| 10,800,057 | B1 * | 10/2020 | Blake | B26B 21/522 |
| 11,241,805 | B2 * | 2/2022 | Grunbart | B26B 21/527 |
| 11,641,962 | B1 * | 5/2023 | Foxx | A47G 21/08 30/123 |
| 2003/0204958 | A1 * | 11/2003 | Jewell | B26B 21/523 30/537 |
| 2003/0208914 | A1 * | 11/2003 | Ehrlich | B26B 21/522 30/526 |
| 2008/0110025 | A1 * | 5/2008 | Bucalo | B26B 21/523 30/526 |
| 2008/0172882 | A1 * | 7/2008 | Eger | B26B 21/40 30/49 |
| 2009/0100679 | A1 * | 4/2009 | Casciaro | B26B 21/523 30/526 |
| 2011/0271534 | A1 * | 11/2011 | Briganti | B26B 21/523 30/535 |
| 2013/0255455 | A1 * | 10/2013 | McCue | B26B 19/3853 30/43.1 |
| 2014/0290066 | A1 | 10/2014 | Woolfson et al. | |
| 2015/0183119 | A1 * | 7/2015 | Contaldi | B26B 21/527 30/50 |
| 2015/0320172 | A1 * | 11/2015 | Spencer | B26B 21/525 30/30 |
| 2015/0367522 | A1 * | 12/2015 | Martin | B26B 21/527 30/526 |
| 2016/0046027 | A1 * | 2/2016 | Peverini | B26B 13/24 30/195 |
| 2016/0193740 | A1 * | 7/2016 | Phillips | B26B 21/521 30/34.05 |
| 2017/0043492 | A1 * | 2/2017 | Robertson | B26B 21/521 |
| 2018/0009122 | A1 * | 1/2018 | Bruce | B26B 21/522 |
| 2019/0126503 | A1 * | 5/2019 | Greene | B26B 21/527 |
| 2020/0223083 | A1 | 7/2020 | Grunbart | |
| 2021/0339416 | A1 * | 11/2021 | Kopelas | B26B 21/521 |
| 2023/0098412 | A1 * | 3/2023 | Lumpkins | B26B 21/527 30/526 |

OTHER PUBLICATIONS

Roblin, A., "Finger-worn razors", Internet article retrieved Nov. 20, 2020, https://www.trendhunter.com/trends/mini-shaver, pp. 1-6, (Nov. 2013).

Anonymous, "Back shaver, XPREEN adjustable telescopic back hair removal shaver, portable painless back hair trimmer professional body groomer for wet or dry trimmer kit", Internet article, https://www.walmart.com/ip/back-shaver-XPREEN-adjustable-telescopic-hair-removal-portable-painless-trimmer-professional-body-groomer-wet-dry-kit/229135451, Internet article retrieved Nov. 25, 2020. pp. 1-3, 12-13, (2020).

* cited by examiner

PROPRIOCEPTIVE SHAVER

FIELD OF THE INVENTION

The present invention is related to medical devices; to shaving devices for use in medical procedures; and more particularly, to a proprioceptive shaver for shaving intimate areas and designed to provide a safer intimate grooming experience in areas that are typically hard to shave safely.

BACKGROUND OF THE INVENTION

Use of shaving systems for removal of hair from a body is well known in the art. Typical type razors include those described by: U.S. Pat. Nos. 10,513,041, 10,137,586, 10,137,585, 9,713,879, 8,726,528, U.S. Publication No. 2020/0223083, U.S. Publication No. 2014/0290066, WO Publication No. 2019/093931, or WO Publication No. 2012/107713.

Such devices, however, are not safe when used for grooming/shaving in areas that are typically hard to shave safely as they fail to provide the user the necessary or proper awareness of the position and movement of the parts of the body by means of sensory organs (proprioceptors) in the muscles and joints controlling the movement of the razor head.

SUMMARY OF THE INVENTION

The present invention relates to a shaving device, preferably for use in shaving intimate areas, configured to provide a safer intimate grooming experience in areas that are typically hard to shave safely. The proprioceptive shaver is configured to provide enhanced control of the razor blade as the razor blade is moved over or contacts an area of skin to be shaved or groomed. Use of the term "proprioceptive shaver" is based on the following. Applicant's shaving device is designed to utilize multiple points of contact with a user's hand, thus providing the user the necessary or proper awareness of the position and movement of the parts of the body by means of sensory organs (proprioceptors) in the muscles and joints controlling the movement of the razor head. This creates a unique and exquisite control of the razor blade being utilized to shave a body, particularly when shaving intimate parts of the body. The points of contact include, directly underneath the metacarpophalangeal joint of two fingers of the same hand, or the area just distal to the metacarpophalangeal joint and proximal to the proximal interphalangeal joint, or the distal inferior phalanges (fingertips) of the same two fingers on the same hand. As a result, a unique leverage is created between the metacarpophalangeal joint and the distal two inferior phalanges (fingertips) on the same hand. This unique and exaggerated leverage creates an increased proprioception and awareness of the position and movement of the razor while it is being moved across intimate skin. This increased proprioception of the razor blades allows for a much safer intimate grooming experience in areas that are difficult to shave safely.

In an illustrative embodiment, a proprioceptive shaver for shaving one or more portions of a body may comprise a main body having a first end and a second opposing end; a user engagement member configured to provide, at multiple points, contact with a user's hand when in use; and a shaving assembly comprising a razor head having at least one or more cutting surfaces. The multiple points of contact may include areas at or near the metacarpophalangeal joint, proximal interphalangeal joint and distal inferior phalange of the user's hand.

In an illustrate example, the multiple points of contact may include an area directly underneath the metacarpophalangeal joint of two fingers of the same hand, an area just distal to the metacarpophalangeal joint and proximal to the proximal interphalangeal joint, a distal inferior phalanges (fingertips) of the same two fingers on the same hand, all three contact points, or any combination thereof.

Accordingly, it is an objective of the invention to provide an improved shaving device.

It is a further objective of the invention to provide a shaving device configured to provide a safer intimate grooming experience in areas that are typically hard to shave safely.

It is yet another objective of the invention to provide a proprioceptive shaver for shaving intimate areas.

It is a still further objective of the invention to provide a proprioceptive shaver for shaving intimate areas, such as the human genitalia, and/or the surrounding area.

It is a further objective of the invention to provide a proprioceptive shaver for shaving intimate areas which provides a user three points of contact on two fingers of the same hand.

It is yet another objective of the invention to provide a proprioceptive shaver for shaving intimate areas which is configured to provide unique leverage and balance, allowing for control of the razor blade during shaving of intimate parts of the body.

It is a still further objective of the invention to provide a proprioceptive shaver for shaving intimate areas which is configured to provide a user with increased awareness of the position and movements of the razor as it is moved across the skin or shaving area.

It is a further objective of the invention to provide a proprioceptive shaver for shaving intimate areas which is configured to provide a user with increase proprioception of the position and movements of the razor as it is moved across the skin or shaving area.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
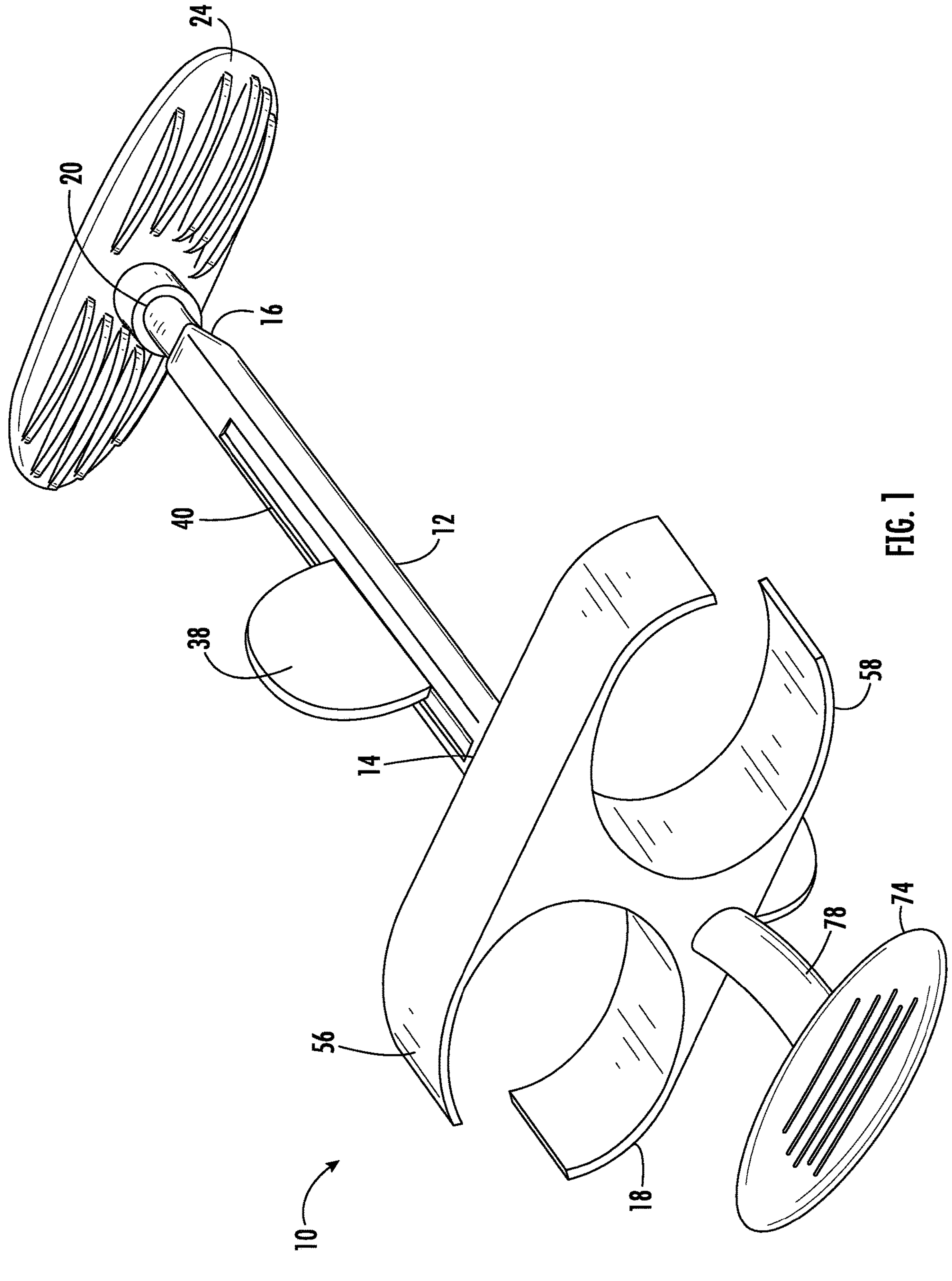
FIG. 1 is a prospective view of an illustrative embodiment of a proprioceptive shaver for shaving intimate areas.
Figure 2:
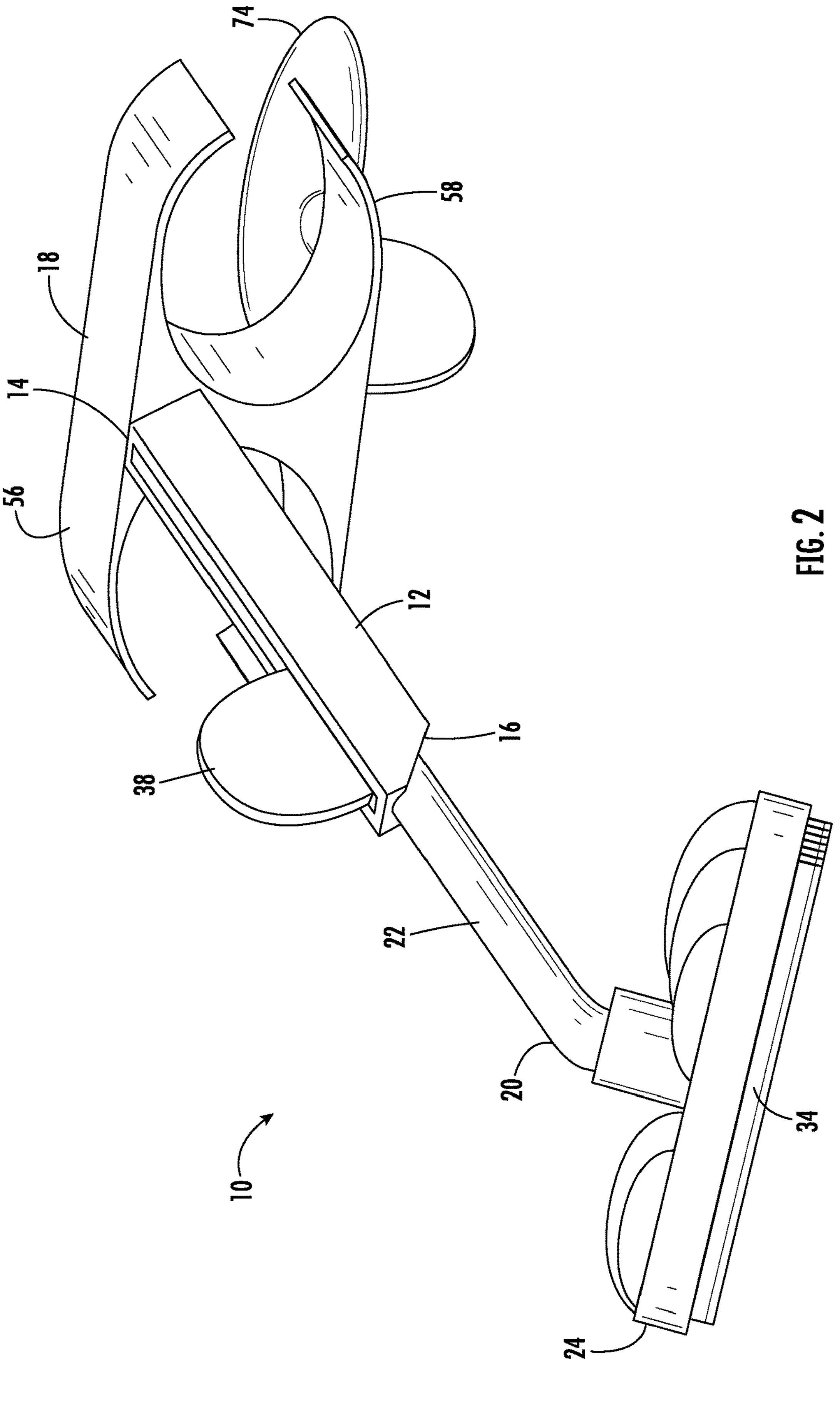
FIG. 2 is an alternative prospective view of the proprioceptive shaver for shaving intimate areas.
Figure 3:
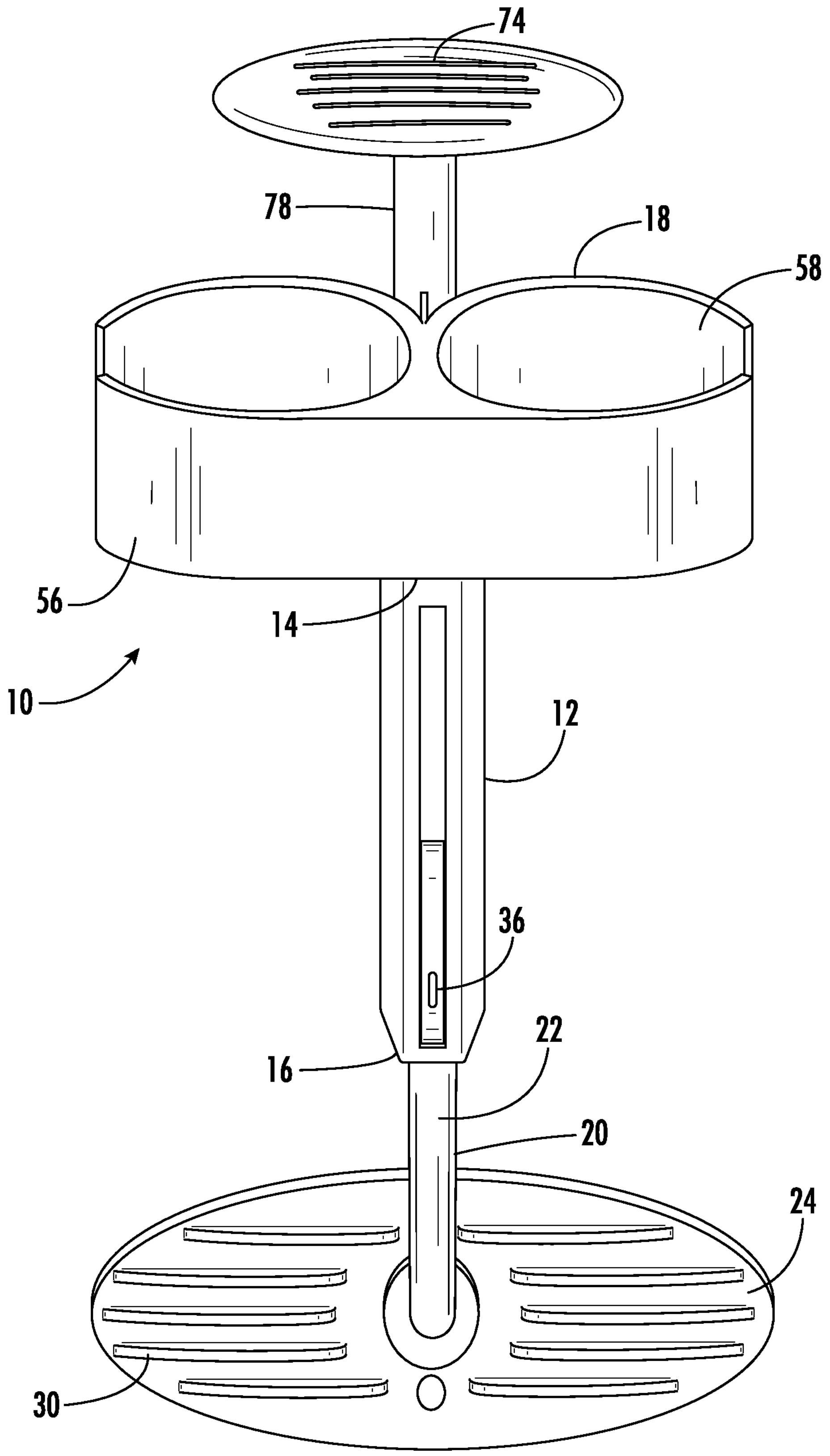
FIG. 3 is a top view of the proprioceptive shaver for shaving intimate areas.
Figure 4:
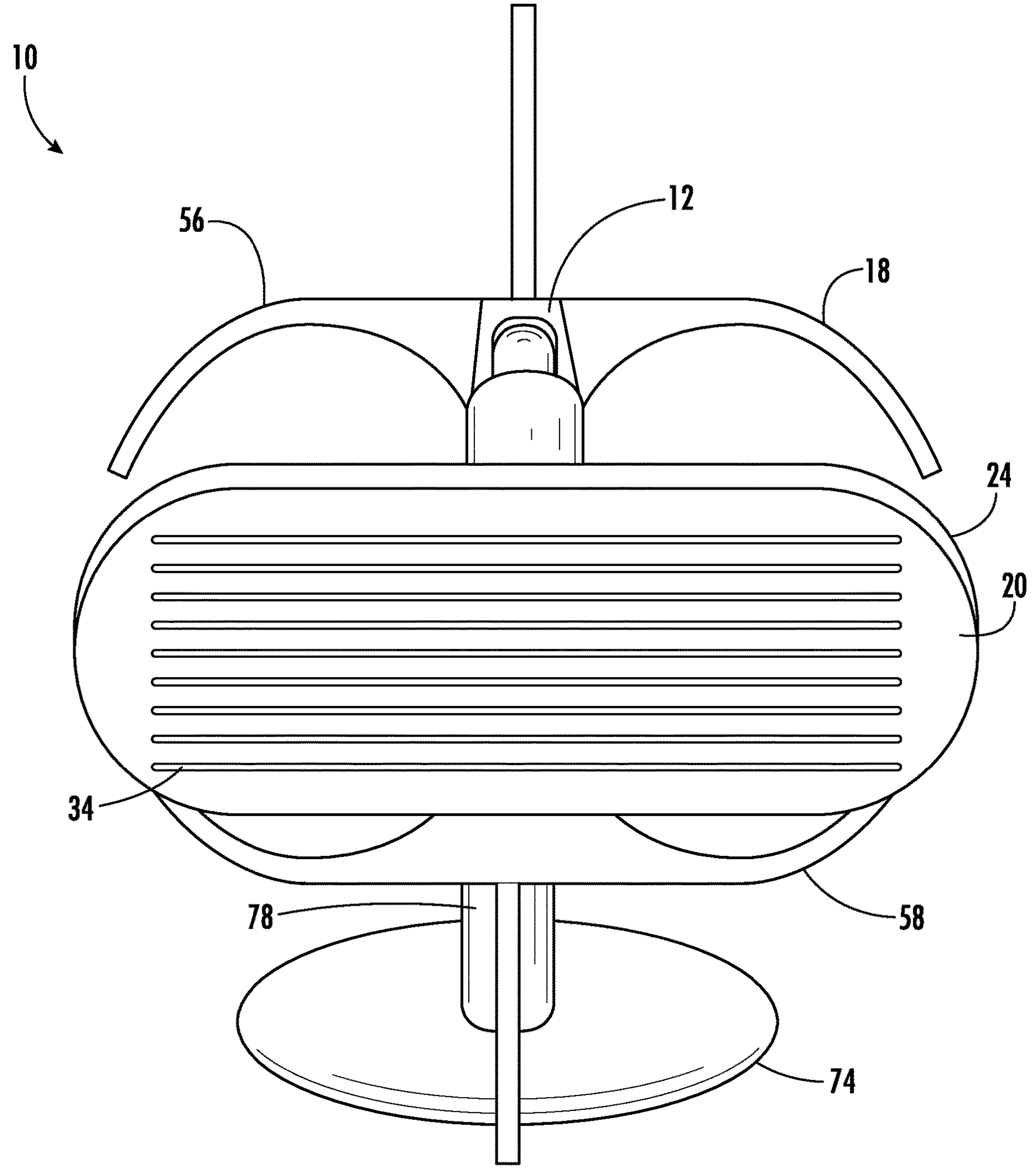
FIG. 4 is a front view of the proprioceptive shaver for shaving intimate areas.
Figure 5:
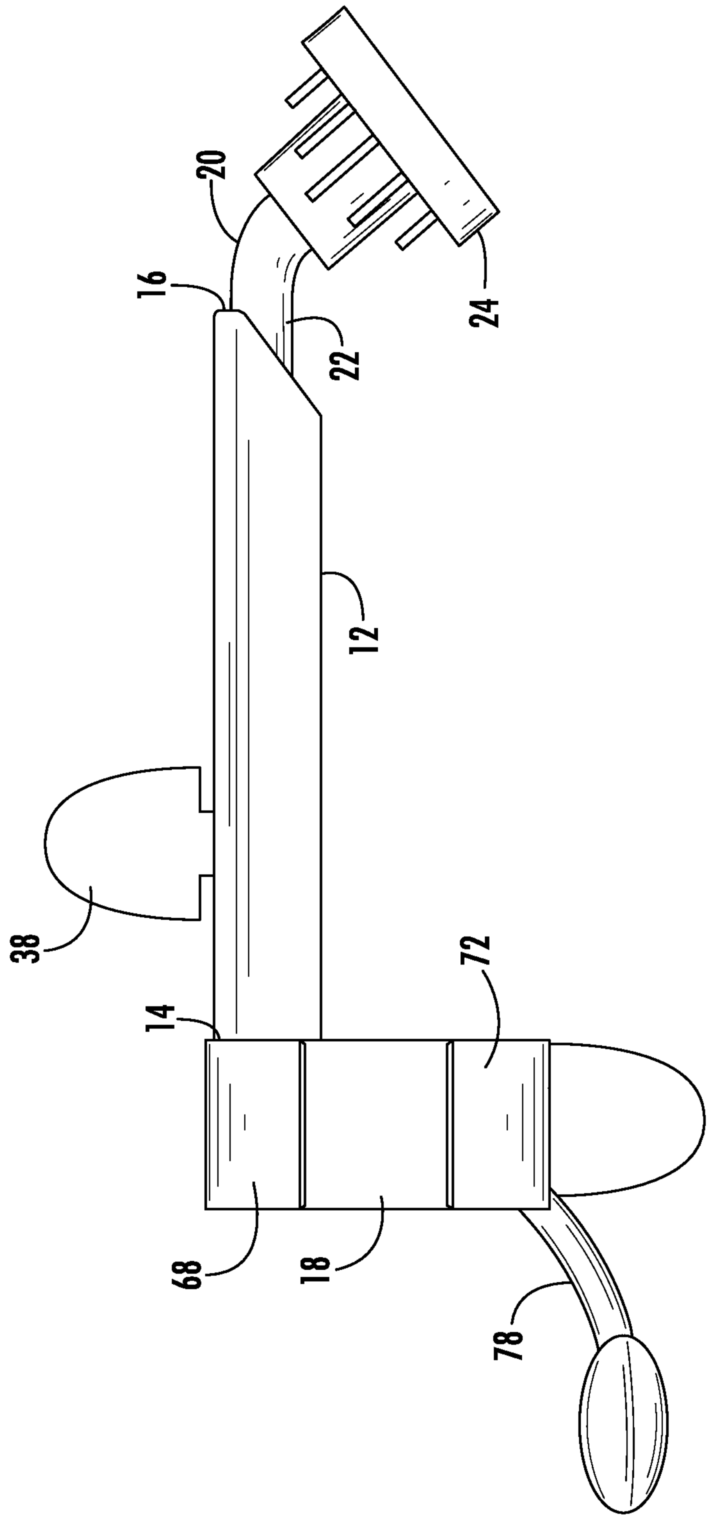
FIG. 5 is a right side view of the proprioceptive shaver for shaving intimate areas.
Figure 6:
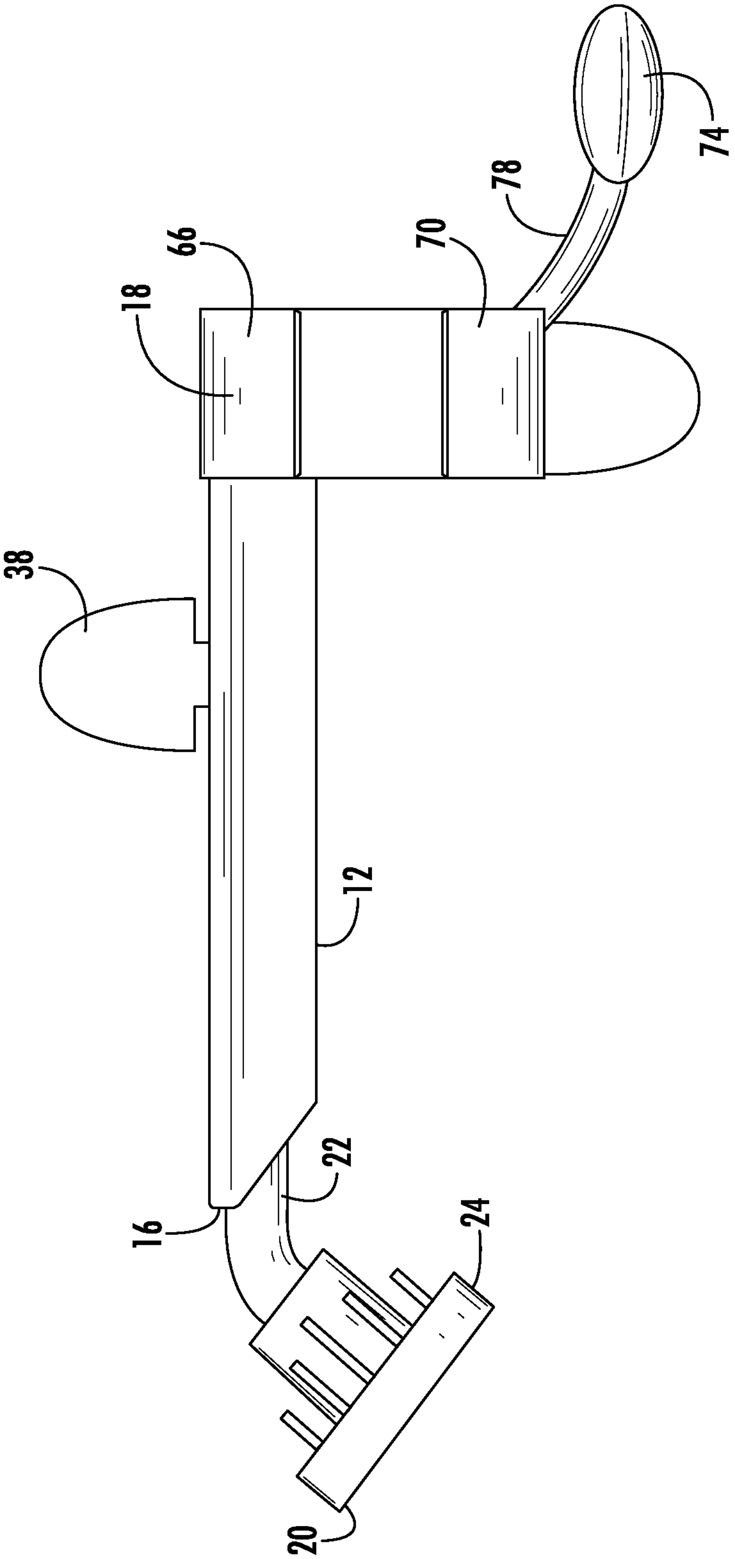
FIG. 6 is a left side view of the proprioceptive shaver for shaving intimate areas.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIGS. 1-6, an illustrative embodiment of a proprioceptive shaver for shaving/grooming intimate areas, referred to generally as a proprioceptive shaver 10, is shown. The proprioceptive shaver 10 is configured to provide enhanced control of the razor blade as the razor blade is moved over or contacts an area of skin to be shaved or groomed. While the proprioceptive shaver 10 will be described as being useful in shaving grooming intimate areas, such as human genitals and/or surrounding areas, such as a vagina, penis, or testicles, the proprioceptive shaver 10 can be used on other parts of a body as well. Moreover, while the proprioceptive shaver 10 may have particular use in surgical settings or procedures, such use is not intended to be limiting. The proprioceptive shaver 10 comprises a main body 12 separating a first end 14 and a second, opposing end 16. The first end 14 comprises a user engagement portion or member 18 integrally formed from or attached thereto. At the second end 16, a shaving assembly 20 extends therefrom.

Figure 9A:
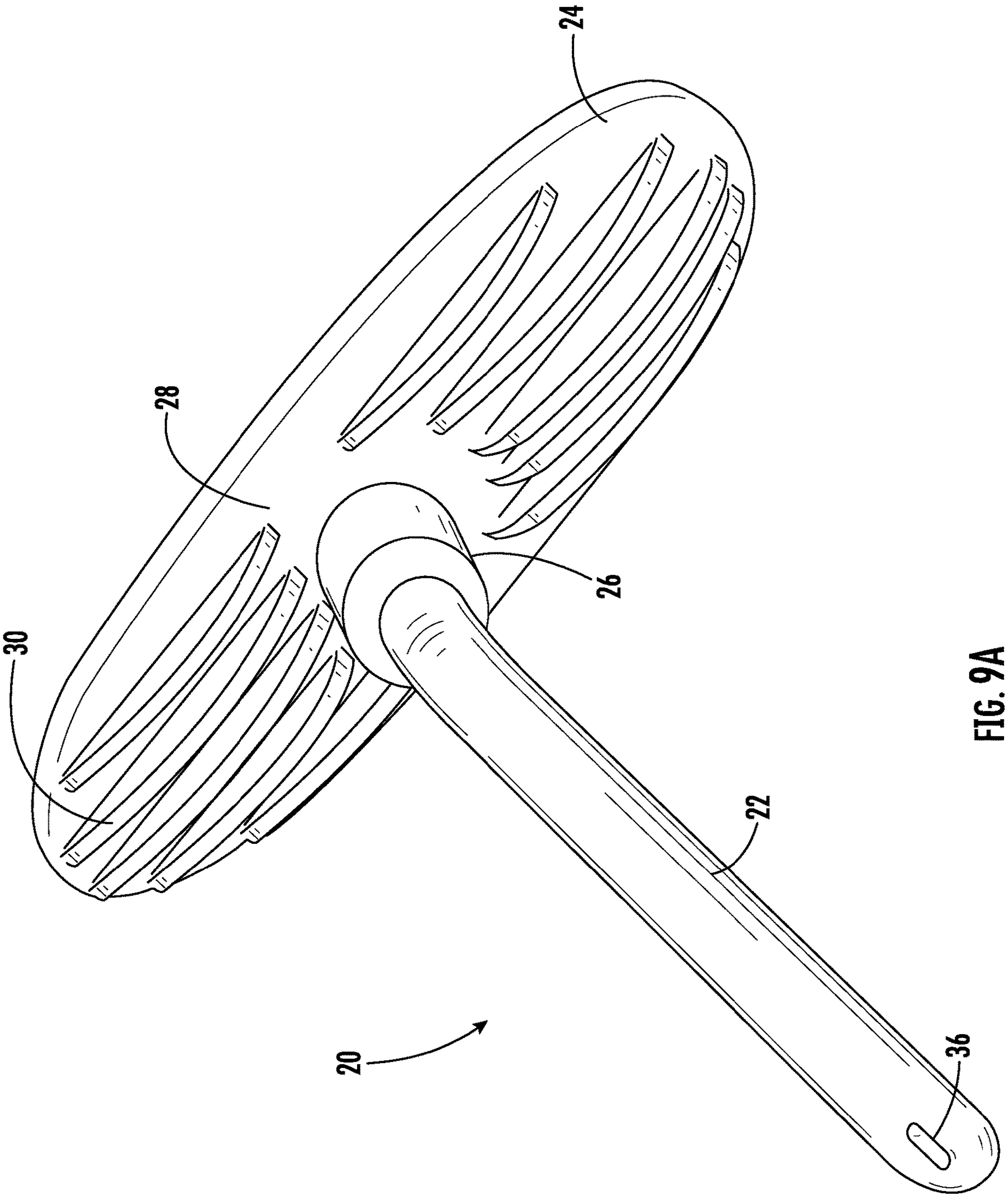
FIG. 9A is a perspective view of the shaving assembly portion/member of the proprioceptive shaver for shaving intimate areas.
Figure 9B:
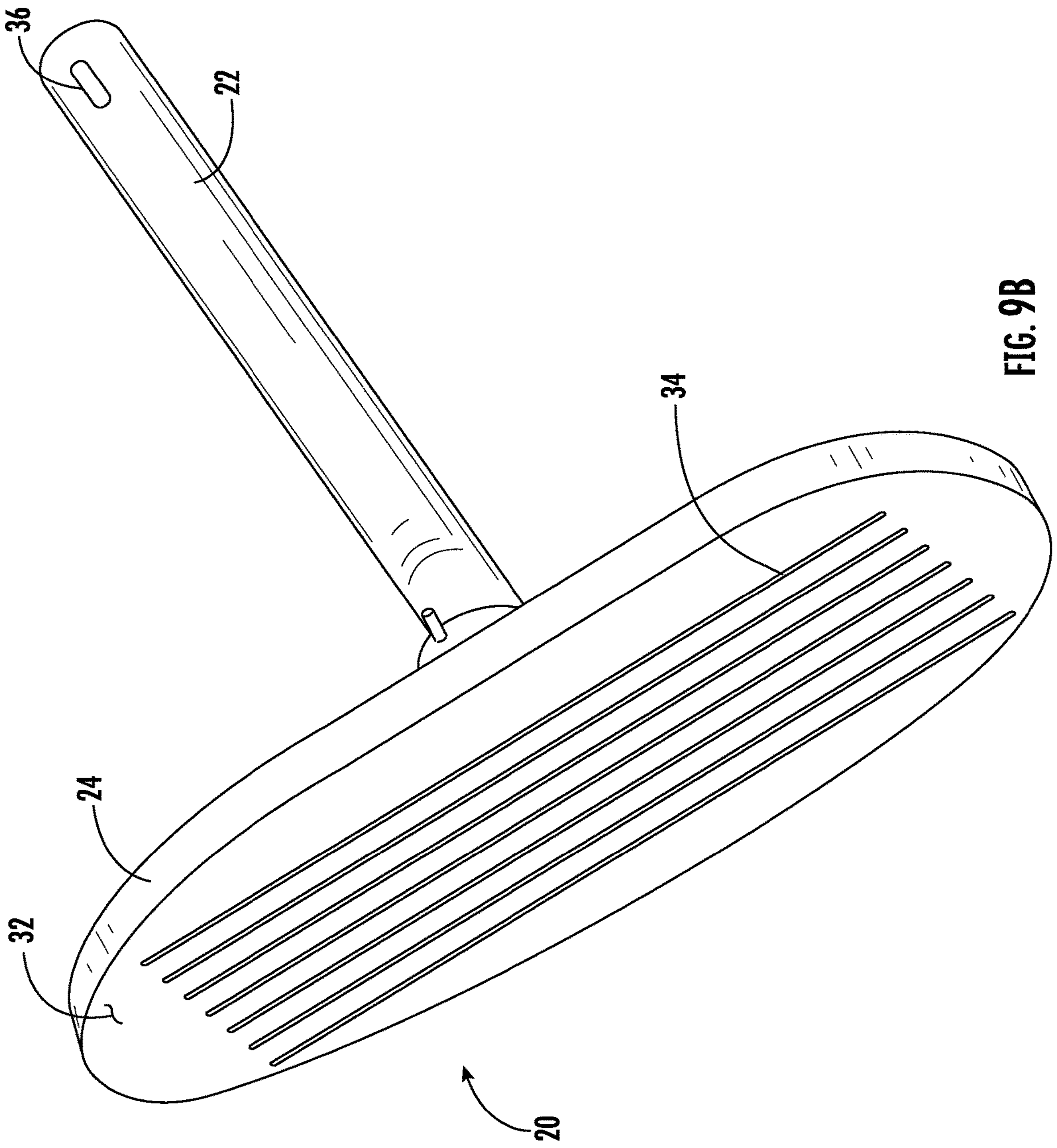
FIG. 9B is an alternative perspective view of the shaving assembly portion/member of the proprioceptive shaver for shaving intimate areas.
Figure 10A:
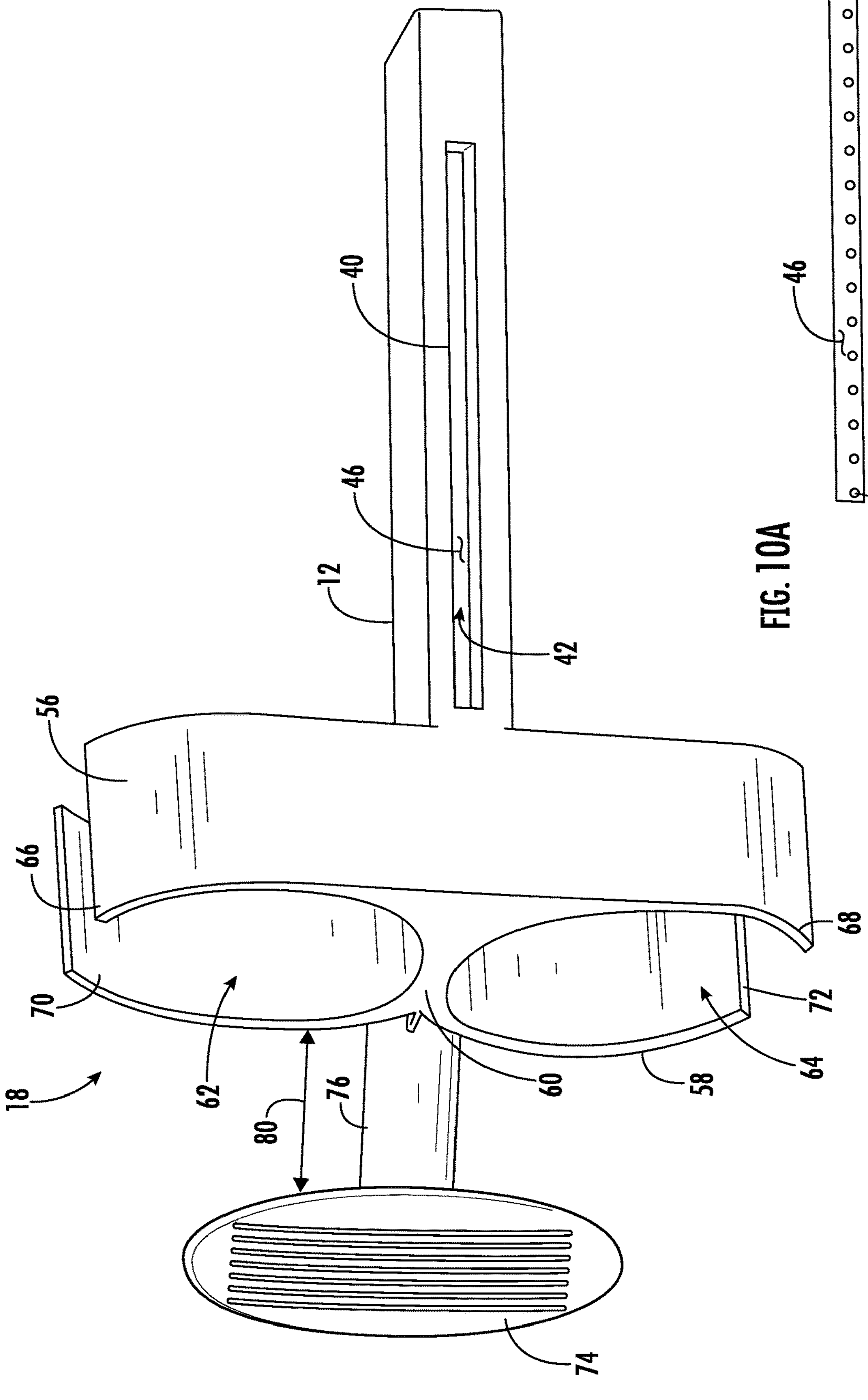
FIG. 10A is a top view of the proprioceptive shaver main body, shown with the shaving assembly removed.
Figure 10B:
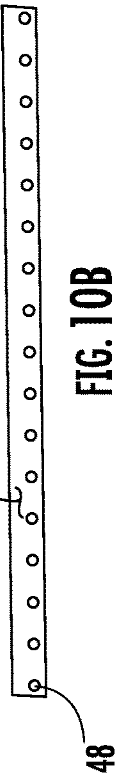
FIG. 10B illustrates one of the internal surfaces of the proprioceptive shaver main body.
Figure 11:
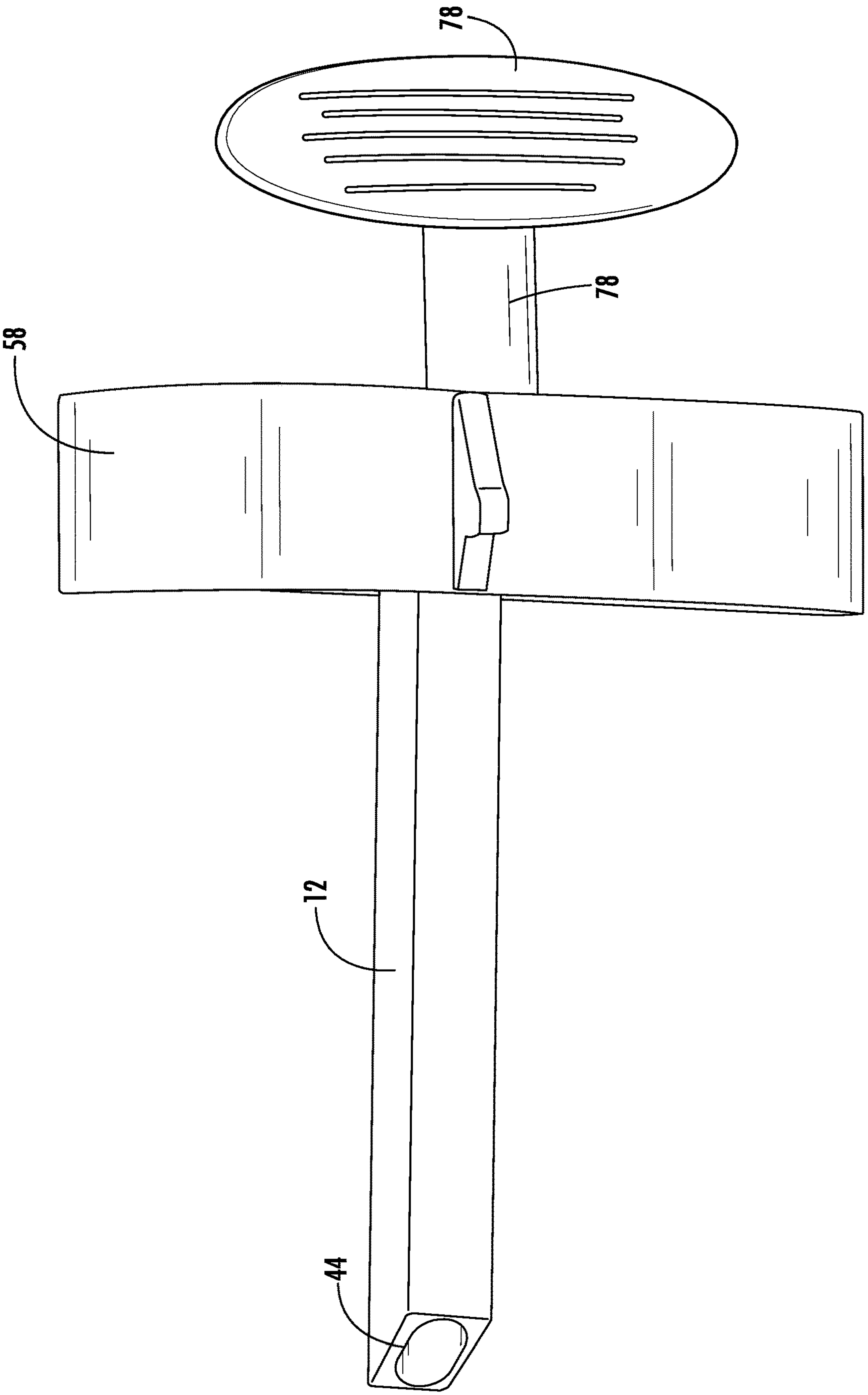
FIG. 11 is a bottom view of the proprioceptive shaver main body, shown with the shaving assembly removed.

Referring to FIGS. 9A and 9B, an embodiment of the shaving assembly 20 is shown. The shaving assembly 20 comprises a body 22, illustrated herein as an elongated shaft or arm, secured to a razor head 24 via a joint 26. The shaving assembly shaft or arm 22 may be straight or contain a curvature. The shaving assembly shaft or arm 22 is sized and shaped to fit and move within the interior portion or region (to be described later) of the proprioceptive shaver main body 12. The razor head 24 may comprise a first surface 28 having one or more griping surfaces 30, shown herein as ridges to allow a user's fingers to grip the razor head 24 when in use, i.e. grooming or shaving. A second, opposing surface 32 may contain one or more cutting surfaces 34, such as razor blades. The shaving assembly shaft or arm 22 may contain an opening 36 sized and shaped to receive and store therein a locking member 38, illustrated herein as a pin (see FIG. 1). Once inserted, the pin 38 locks the shaving assembly shaft or arm 22 in place (at various positons) within the proprioceptive shaver main body 12.

Referring to FIGS. 10A-13, the proprioceptive shaver main body 12 is shown with the shaving assembly 20 removed. The proprioceptive shaver main body 12 may comprise an opening 40, illustrated herein as an open slit or channel, exposing the interior portion or region 42. The interior portion or region 42 is preferably hollow or partially hollow and sized and shaped to allow at least a portion of the shaving assembly shaft or arm 22 to fit within, and to move, preferably slidably in a linear direction therein. A user simply inserts at least a portion of the shaving assembly shaft or arm 22 into the proprioceptive shaver main body second end opening 44. Once in a desired position, the user places the pin 38 into the shaving assembly shaft or arm opening 36. The interior portion bottom surface 46 (see FIGS. 10A and 10B) of the proprioceptive shaver main body 12 may contain a plurality of spaced apart pin receiving members 48, illustrated herein as dimples or small openings.

Figure 7:
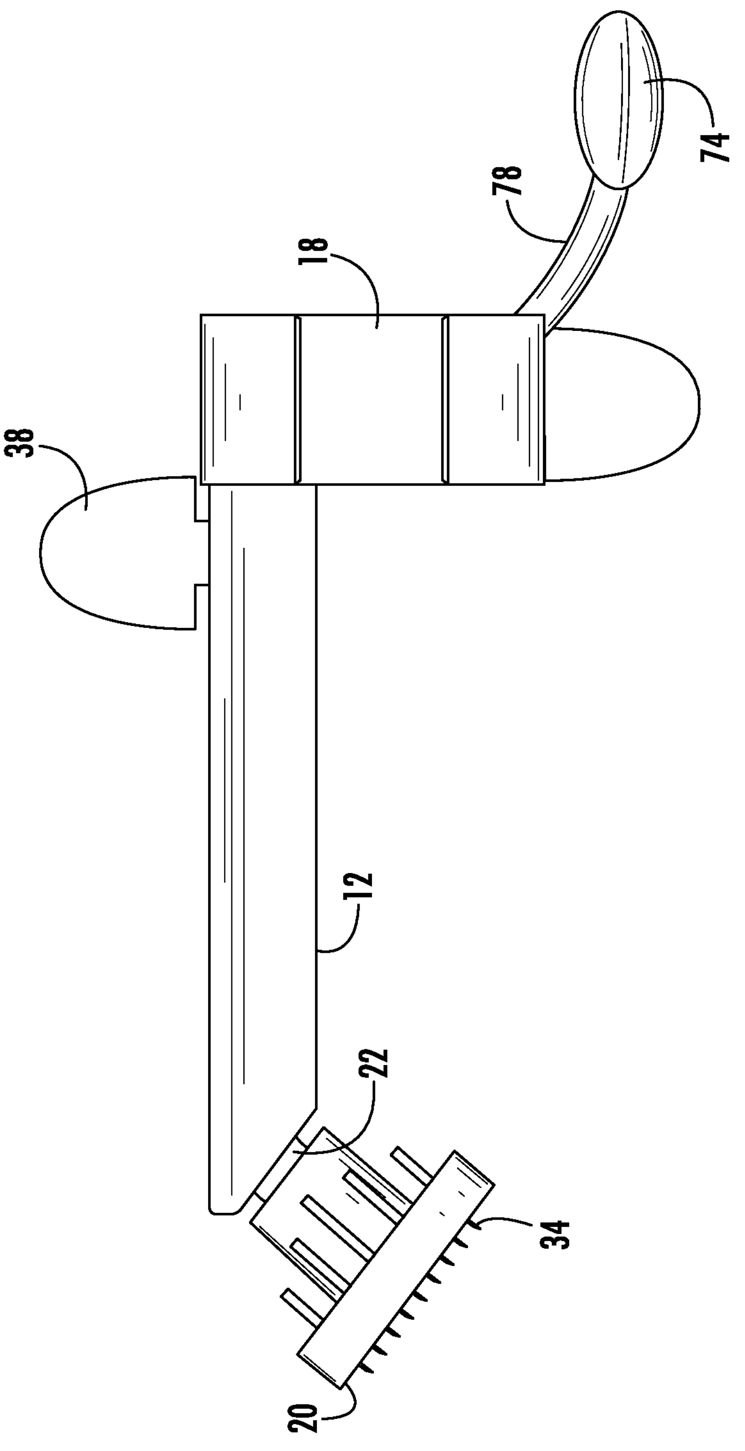
FIG. 7 illustrates the proprioceptive shaver for shaving intimate areas in a first, non-extended position.
Figure 8:
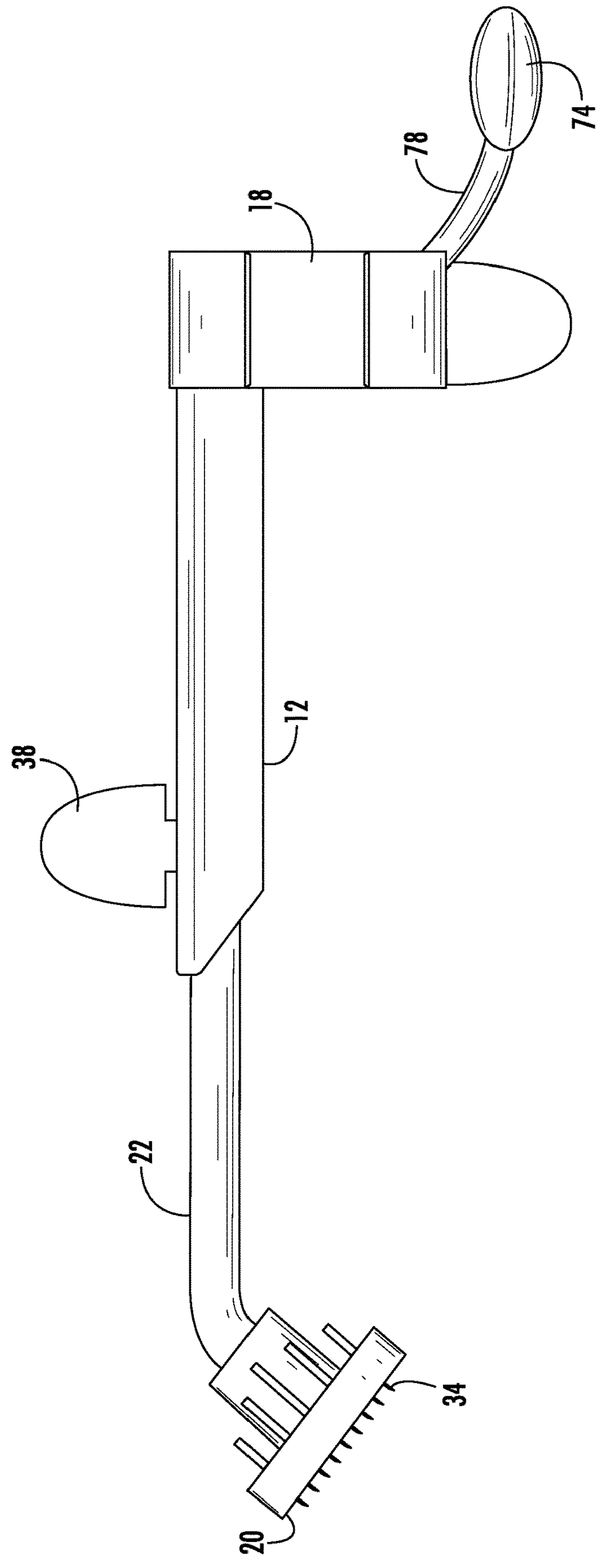
FIG. 8 illustrates the proprioceptive shaver for shaving intimate areas in a second, extended position.

When at least a portion of the pin 38 (preferably a pointed portion) is oriented to and rests within the pin receiving members 48, the shaving assembly shaft or arm 22 is locked in place. To orientate and position the shaving assembly shaft or arm 22 in another location within the proprioceptive shaver main body 12, the user removes the pin 38, slides the shaving assembly shaft or arm 22 to the left or right (further or closer to the first end 14), see FIG. 7, the proprioceptive shaver for shaving intimate areas in a first, non-extended position and FIG. 8, the proprioceptive shaver for shaving intimate areas in a second, extended position. Once in the desired position, the user simply places the pin 38 into and through opening 36. A portion of the pin 38 rests within one of the pin receiving members 48, locking the shaving assembly shaft or arm 22 in place.

Figure 14:
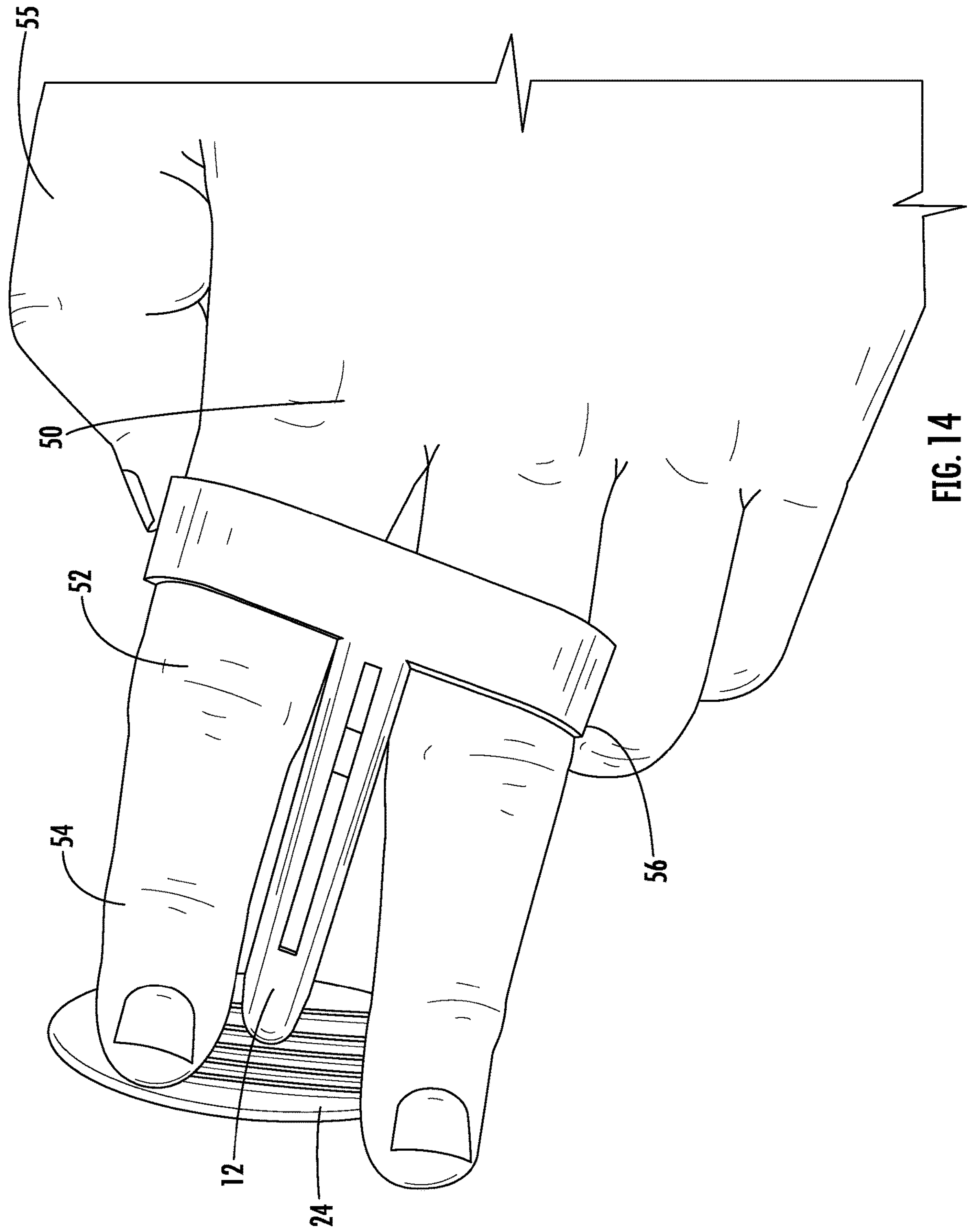
FIG. 14 illustrates the proprioceptive shaver for shaving intimate areas secured in a user's hand.

The user engagement portion or member 18 is configured to provide the user unique control of the razor head 24 during the grooming or shaving process. Such control is vital for areas such as the human genitals, or surrounding area, that are difficult for an individual to shave themselves safely and effectively. The user engagement portion or member 18 is configured so the proprioceptive shaver 10 provides users with increased awareness of the position and movement of the parts of the body by means of sensory organs (proprioceptors) in the muscles and joints controlling the movement of the razor head 24. Accordingly, the proprioceptive shaver 10 is configured to provide multiple, preferably three, points of contact on two fingers of the same hand. The three points of contact include areas at or near the metacarpophalangeal joint 50, proximal interphalangeal joint 52, and distal inferior phalanges (fingertips) 54 of the user's hand 55, see FIG. 14. More specifically, the three points of contact include:

1. The area directly underneath the metacarpophalangeal joint of two fingers of the same hand;
2. The area just distal to the metacarpophalangeal joint and proximal to the proximal interphalangeal joint which acts as a fulcrum with no finger contact until #3; and
3. The distal inferior phalanges (fingertips) of the same two fingers on the same hand, which is connected to number two by a flexible adjustable shaft (to be described later).

Figure 15:
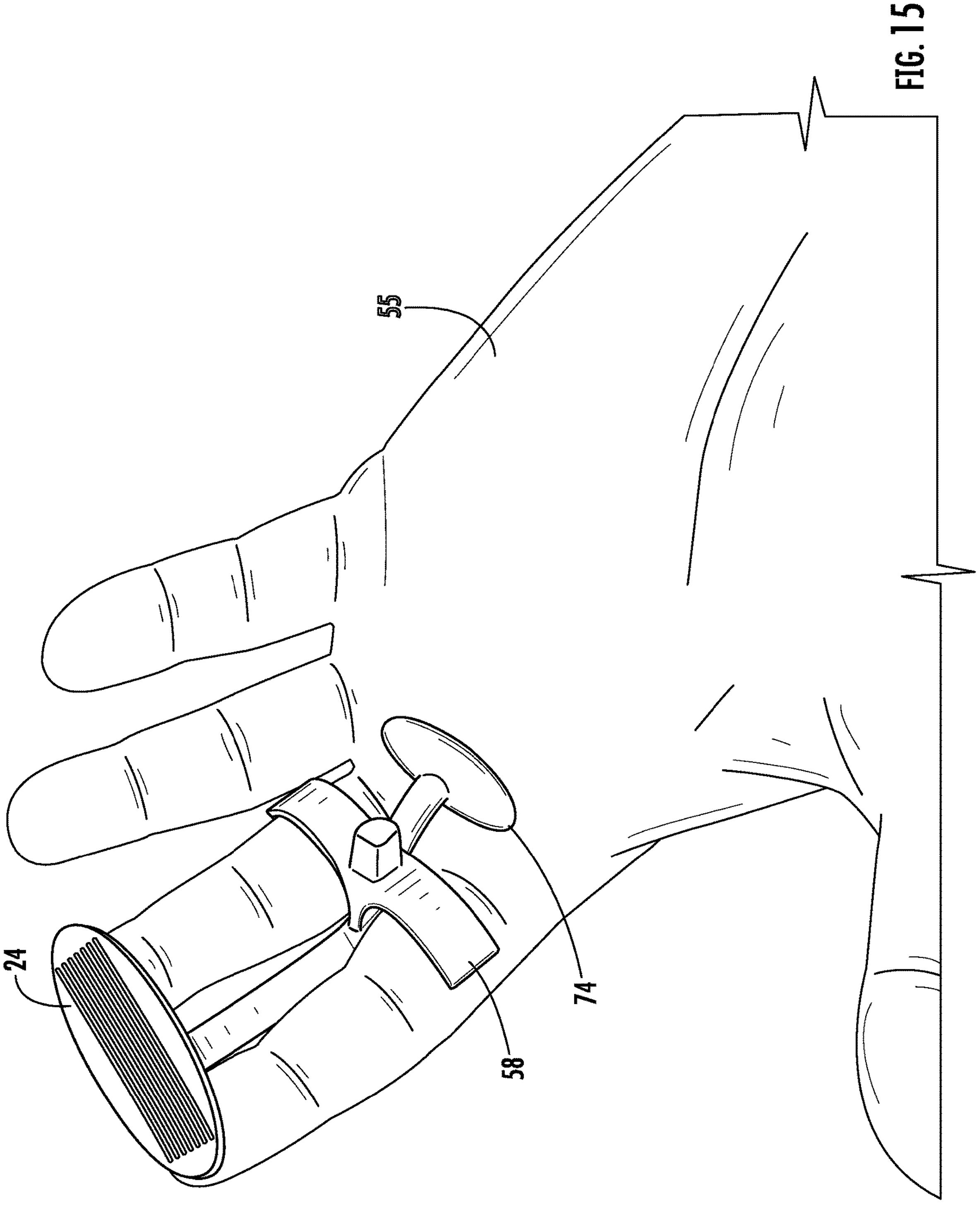
FIG. 15 illustrates an alternative view of the proprioceptive shaver for shaving intimate areas secured in a user's hand.

As a result, a unique leverage is created between the metacarpophalangeal joint and the distal two inferior phalanges (fingertips) on the same hand. This unique and exaggerated leverage creates an increased proprioception and awareness of the position and movement of the razor while it is being moved across intimate skin. This increased proprioception of the razor blades allows for a much safer intimate grooming experience in areas that are difficult to shave safely, see FIGS. 14 and 15.

The user engagement portion or member 18 may include a first portion (also referred to as an upper portion, referring to positioning on an anterior (back or dorsal side) surface of a finger) 56, a second portion (also referred to as a lower portion referring to positioning on a posterior (palmer side) surface of a finger) 58, and a bridge 60 connecting the upper portion 56 and the lower portion 58. The upper portion 56 and the lower portion 58 are preferably arranged in a parallel or generally parallel arrangement, separated by a first opening 62 (to the left of bridge 60) and a second opening 64 (to the right of bridge 60). The upper portion distal ends 66 and 68 may have a partial curvature and extend down towards (but do not touch, thus forming an open or partial ring configuration) lower portion distal ends 70 and 72. The lower portion distal ends 70 and 72 may also have a partial curvature and extend upwards) towards (but do not touch, thus forming an open or partial ring configuration) upper portion distal ends 66 and 68. Both areas define the size and shape of openings 62 and 64, which are sized and shaped to fit, receive and support portions of a user's fingers. The upper portion 56 and the lower portion 58, particularly the upper portion distal ends 66 and 68 and the lower portion distal ends 70 and 72 may be made of a flexible material so that they can accommodate different sized fingers. Alternatively, the upper portion distal ends 66 and 68 and the lower portion distal ends 70 and 72 may connect, thus forming a closed ring structure.

Positioned away from the upper portion 56 and the lower portion 58 is a leverage bar 74. The leverage bar 74 is attached to or is integrally formed from a portion of the lower portion 58 as an intermediate member 76, illustrated herein as an elongated body. The intermediate member 76 is shown having a curved surface 78, see FIG. 5, which positions the leverage bar 74 away from the upper portion 56 and the lower portion 58 of the user engagement portion or member 18 via a distance or gap 80, and orientating the leverage bar 74 so it 1) is parallel or generally parallel to the upper portion 56 and the lower portion 58, and 2) when in use, rests in the area directly underneath the metacarpophalangeal joint of two fingers of the same hand. Accordingly, the size (and shape) of the leverage bar 74 must be sufficient to rest and/or span in the area directly underneath the metacarpophalangeal joint of two fingers of the same hand. The distance or gap 80 must be sufficient, so when in use (placed on two fingers), the upper portion 56 and the lower portion 58 aligns with or rests at the area just distal to the metacarpophalangeal joint and proximal to the proximal interphalangeal joint, acting as a fulcrum with no finger contact until distal inferior phalanges (fingertips) of the same two fingers on the same hand contact the razor head 24.

Figure 12:
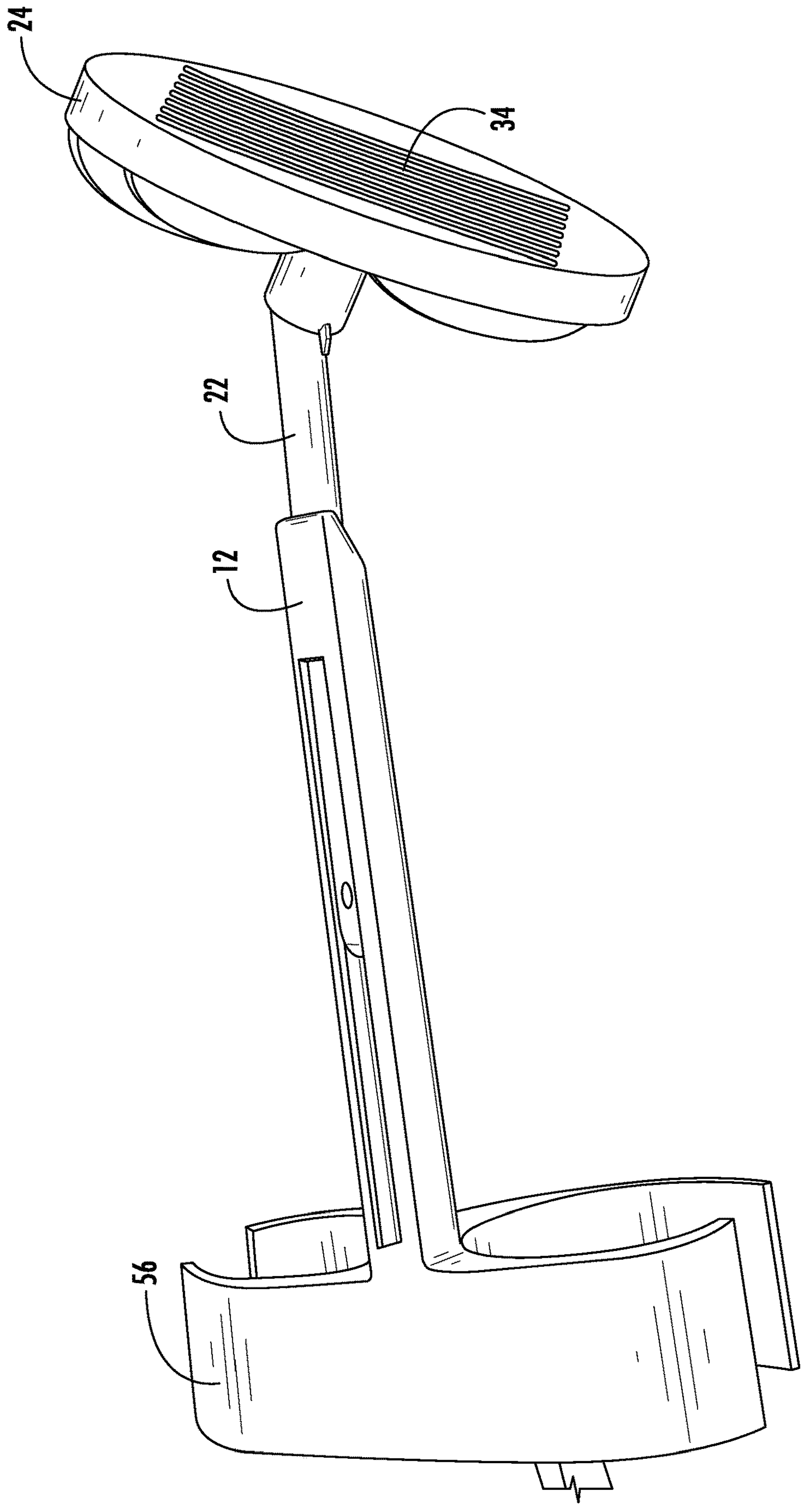
FIG. 12 illustrates the razor portion of the shaving assembly portion/member shown rotated from a first shaving position.
Figure 13:
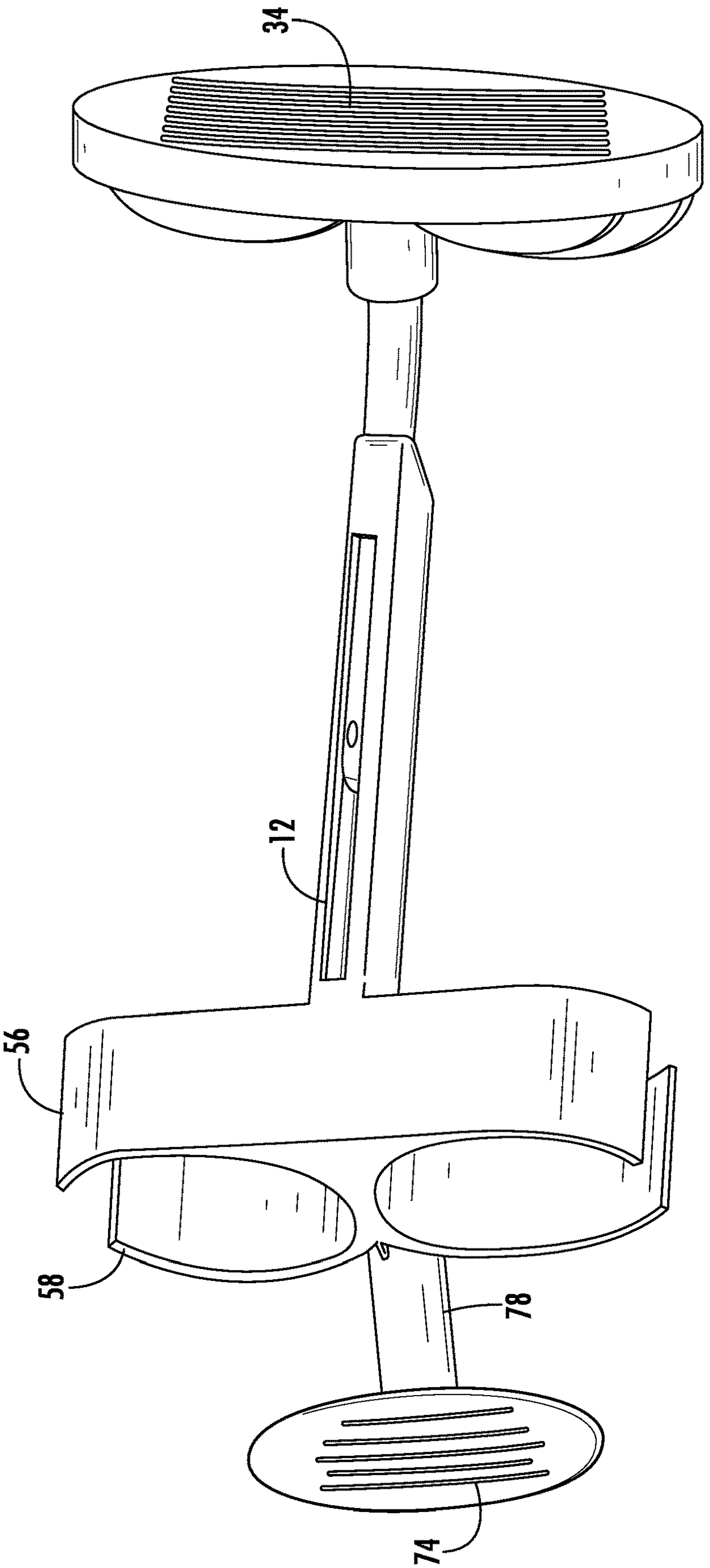
FIG. 13 illustrates the razor portion of the shaving assembly portion/member shown rotated from a first shaving position.

The proprioceptive shaver 10 may also comprise a razor head 24 which is configured to rotate (greater than 0 degrees to 360 degrees). FIG. 12 illustrates the razor head 24 rotated 90 degrees from a first position (as shown in FIG. 1). Figure illustrates the razor head 24 rotated 180 degrees from the first position. Such rotation allows a user to shave with the grain or against the grain, allowing the user to push or pull while shaving. The razor head 24 may rotate simply by rotating the shaving shaft or arm 22 and locking in place as described above. Alternatively, the razor head 24 may be designed to pivot and rotate about the shaving shaft or arm 22.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A proprioceptive shaver for shaving one or more portions of a body comprising:

a main body having a first end and a second, opposing end, and arranged in a perpendicular orientation relative to a user engagement member;

said user engagement member comprising a first opening constructed and arranged to receive a first finger of a user's hand and a second opening constructed and arranged to receive a second finger, said first opening having a center axis that is parallel to a longitudinal axis of said main body, said second opening having a center that is parallel to said main body longitudinal axis; and a shaving assembly comprising a razor head, said razor head having a non-cutting surface and an opposing cutting surface, the non-cutting surface for engaging ends of said first finger and said second finger when said fingers are in said openings thereby providing points of contact with said user's hand; and a leverage bar extending from said user engagement member, said leverage bar for engaging said user's hand when said fingers are in said openings thereby providing points of contact with said user's hand.

2. The proprioceptive shaver for shaving one or more portions of a body according to claim 1, wherein said cutting surface includes one or more razor blades.

3. The proprioceptive shaver for shaving one or more portions of a body according to claim 1, wherein said leverage bar extends from said user engagement member and has a surface for contact of an area underneath the metacarpophalangeal joint of said first or second fingers of said user's hand.

4. The proprioceptive shaver for shaving one or more portions of a body according to claim 1, wherein said user engagement member comprises an upper portion partially defining said first and second openings, and configured to engage with back or dorsal side surfaces of said first finger and said second finger of said user's hand when in use and a lower portion partially defining said first and second openings, and configured to engage with palmer surfaces of said first finger and said second finger of said user's hand when said fingers are in said openings.

5. The proprioceptive shaver for shaving one or more portions of a body according to claim 1, wherein said first opening and said second opening are formed as two partially open ring shaped structures.

6. The proprioceptive shaver for shaving one or more portions of a body according to claim 1, wherein said leverage bar connects to said lower portion via an intermediate portion.

7. The proprioceptive shaver for shaving one or more portions of a body according to claim 1, wherein said shaving assembly is positioned at an angle relative to said main body.

8. The proprioceptive shaver for shaving one or more portions of a body according to claim 1, wherein said razor head non-cutting surface has one or more gripping surfaces.

9. The proprioceptive shaver for shaving one or more portions of a body according to claim 1, wherein said first opening and said second opening are formed as two closed ring shaped structures.

10. The proprioceptive shaver for shaving one or more portions of a body according to claim 1, wherein said shaving assembly further comprises a shaft.

11. The proprioceptive shaver for shaving one or more portions of a body according to claim 10, wherein said shaving assembly shaft is sized and shaped to fit and move within an interior region of said main body.

12. The proprioceptive shaver for shaving one or more portions of a body according to claim 10, wherein said shaving assembly razor head is rotatable about said shaft or said main body.

13. The proprioceptive shaver for shaving one or more portions of a body according to claim 10, further including a locking member constructed and arranged to engage with said shaft.

14. A proprioceptive shaver for shaving one or more portions of a body comprising:

a user engagement member comprising a first opening and a second opening;

a main body extending in a perpendicular direction from said user engagement member, and having a first end, a second, opposing end, and an interior passageway, said main body having a longitudinal axis arranged in a parallel orientation relative to a center axis of said first opening and a center axis of said second opening;

a shaving assembly comprising an elongated shaft terminating in a razor head, said razor head having a cutting surface and a non-cutting surface, the non-cutting surface for engaging ends of said first finger and said second finger when said fingers are in said openings, said elongated shaft inserted within said interior passageway, with said razor head extending out from said interior passageway to allow a distal inferior phalange of a first finger of a user's hand and a distal inferior phalange of a second finger of said user's hand to rest on said non-cutting surface of said razor head when in use; and a leverage body positioned at a distance from said engagement member, said leverage body positioned in an opposite direction as said main body relative to said user engagement member, said leverage bar for engaging said user's hand when said fingers are in said openings;

wherein, when placed on said user's hand wherein said user's first finger is inserted within said first opening and a distal inferior phalange of said first finger rests on said non-cutting surface and said user's second finger is inserted within said second opening and a distal inferior phalange of said second finger rests on said non-cutting surface, said proprioceptive shaver simultaneously contacts multiple areas of said user's hand.

15. The proprioceptive shaver for shaving one or more portions of a body according to claim 14, wherein said razor head is rotatable about said shaving assembly elongated shaft.

16. The proprioceptive shaver for shaving one or more portions of a body according to claim 14, wherein said razor head is rotatable about said main body.

17. The proprioceptive shaver for shaving one or more portions of a body according to claim 14, wherein said razor head non-cutting surface has a gripping surface.

18. The proprioceptive shaver for shaving one or more portions of a body according to claim 14, wherein said razor head cutting surface comprises one or more cutting blades.

19. The proprioceptive shaver for shaving one or more portions of a body according to claim 14, wherein said first opening and said second opening are formed as partially open ring shaped structures.

20. The proprioceptive shaver for shaving one or more portions of a body according to claim 14, wherein said first opening and said second opening are formed as closed ring shaped structures.

* * * * *